J. FRIEMAN.
WHEEL ATTACHMENT.
APPLICATION FILED APR. 23, 1918.
1,287,279.
Patented Dec. 10, 1918.
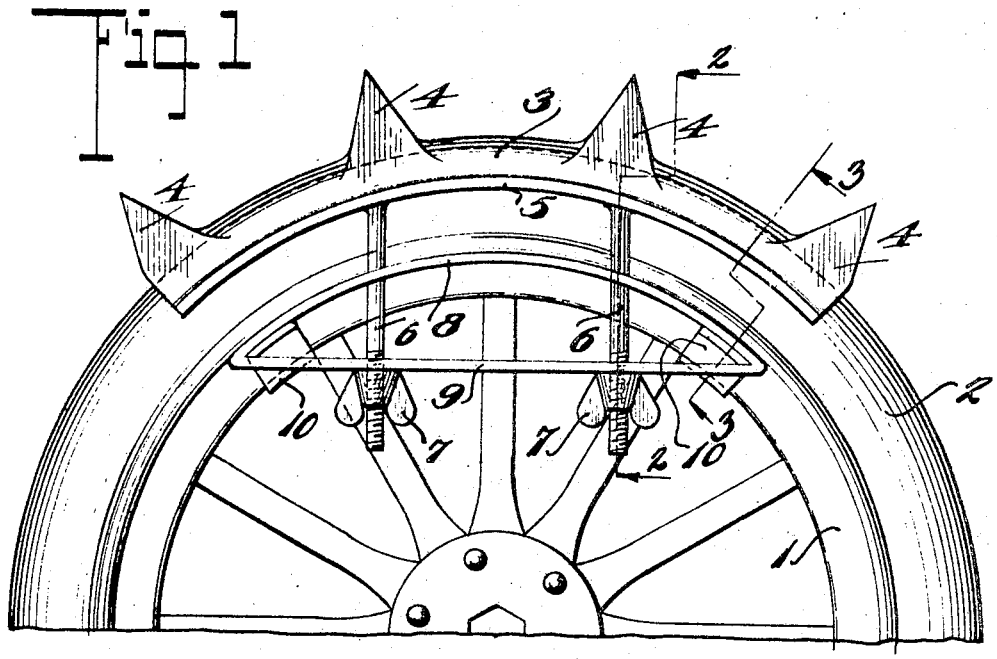
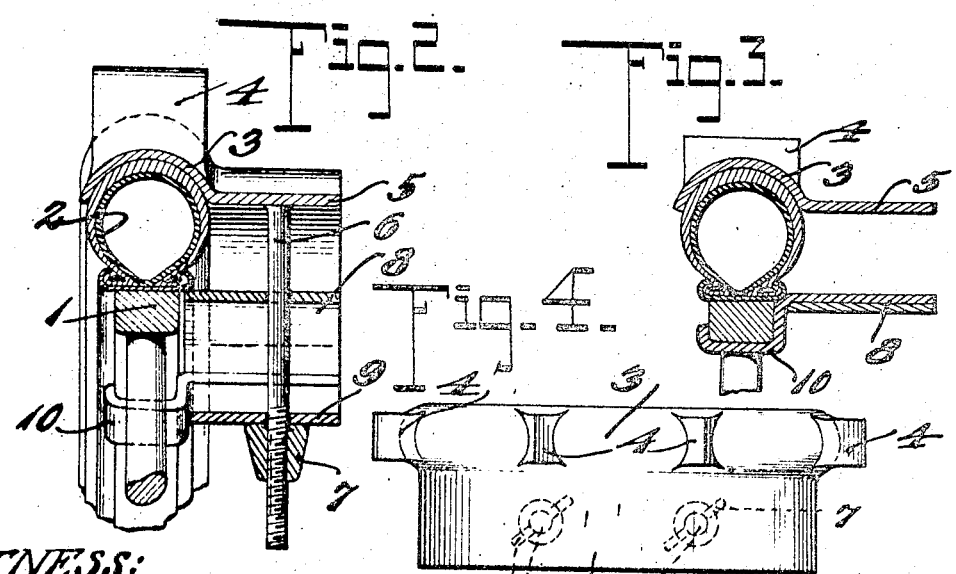
WITNESS:
E. W. Wagner.
INVENTOR
Jacob Frieman
BY Robb & Robb
ATTORNEYS

UNITED STATES PATENT OFFICE.

JACOB FRIEMAN, OF CHICAGO, ILLINOIS.

WHEEL ATTACHMENT.

1,287,279.  Specification of Letters Patent.  Patented Dec. 10, 1918.

Application filed April 23, 1918. Serial No. 230,261.

*To all whom it may concern:*

Be it known that I, JACOB FRIEMAN, a citizen of the United States, residing at Chicago, in the county of Cook and State of Illinois, have invented certain new and useful Improvements in Wheel Attachments, of which the following is a specification.

The present invention relates to improvements in attachments for motor vehicle driving wheels designed for facilitating the operation of extricating a vehicle from ruts, holes or the like, in ice, snow, sand or soft earth.

The novel characteristics of the device consist in the provision of a tread member applicable to the wheel when the same becomes partially embedded, with projections which not only afford gripping action but act to fill the rut at each revolution of the wheel, while the latter is sustained by a supporting surface constituting an important feature of my invention.

In addition to the foregoing, an object in view is to provide novel attaching or clamping means for holding the attachment in place and for withstanding the strains incident to the use of the device as above contemplated.

With the above and other objects in view, this invention consists in the construction, combination and arrangement of parts all as hereinafter more fully described, claimed and illustrated in the accompanying drawings, in which:

Figure 1 is a side elevation of a portion of a vehicle wheel, showing my attachment applied in operative position thereon;

Figs. 2 and 3 are sectional views on the lines 2—2 and 3—3, respectively, of Fig. 1; and Fig. 4 is a top plan of the attachment.

Throughout the following detail description, and on the several figures of the drawing, similar parts are referred to by like reference characters.

Referring to the drawing, 1 designates a conventional type of motor vehicle wheel, and 2 the tire therefor upon which the device forming the subject matter of this invention is applied. This attachment consists of a tread member or plate 3 which conforms to the shape of the tire or tread of the wheel both as regards its circumferential and transverse contours. From this plate there project a number of lugs 4, triangular shaped in cross section. Preferably the opposite effective faces of these projecting lugs are somewhat concaved as will be best seen in Fig. 4, because in performing their function they act in the nature of shovels. From this tread plate 3, an extension plate 5 projects laterally and substantially in alinement with the periphery of the wheel tire. The surface of this extension is a supporting surface as will appear from a description of the use of the device following herein. Projecting from the under surface of the extension plate are a pair of threaded bolt members 6 which pass through suitable openings in the clamping or attaching element of the device hereinafter referred to and carry winged nuts 7, instrumental in holding the device in place.

I employ a special form of clamping means for the tread plate, which as will be observed from Fig. 1 comprises the curved plate 8 and the straight plate 9 joining the ends of the former. Integrally attached and projecting laterally from the ends of the segmental shaped member are a pair of rim engaging or gripping arms 10, by means of which the attachment is positively held on the wheel. It should be particularly observed that these arms are arranged in such spaced relation to each other as to engage about opposite sides of certain of the spokes of the wheel and therefore the attachment is prevented from movement in either direction circumferentially of the wheel. Further than this the curved plate 8 is so disposed as to conform to the curvature of the wheel rim against the side of which it is adapted to be pressed in the use of the device in order that the supporting stress applicable to the extension part 5 will be transferred to the wheel rim. This is an important feature of my invention. While it would be possible to dispense with the plate or part 9 as will be obvious, this plate also subserves a distinctly advantageous feature because considerable pressure may be exerted by the nuts 7 to afford the necessary gripping action without distorting the attachment or segmental shaped member.

While I have illustrated this device as segmental in form, it may be of larger construction so as to cover a greater part of the wheel tread, or all of it if desired. At any rate in the use of the device, and assuming that the vehicle wheel has sunk into such a depression in the surface from which the motor is ineffective to pull the same owing to slippage or loss of traction, the device is attached in place at the top of the wheel, as shown in Fig. 1. As the driving power now turns the wheel and the attachment around, the lateral extension will meet with and ride upon the surface of the ground directly adjacent to the outside of the wheel and by reason of its greater surface area will not sink so deeply into the earth, thereby lifting the vehicle more or less. The lugs or projections 4 engage and move the earth directly in front of the wheel into the rut beneath the wheel, filling the same more or less. Continuous revolution of the wheel simply continues the lifting action above referred to until sufficient gripping of the attachment is obtained to move the vehicle forward and out of the rut whereupon the attachment is displaced, preferably.

It will be apparent that the device is simple in construction and readily attachable to the wheel of a vehicle at any place found convenient, affording a useful accessory for automobile equipment.

Having thus described my invention, what I claim as new is:

1. In a wheel attachment of the class described, the combination with a tread plate adapted to be attached to the wheel tread and having projections extending therefrom, of an extension arranged laterally of the tread plate and constituting supporting means for sustaining the wheel upon the surface adjacent thereto, and means for attaching the plate to the wheel including a rim engaging element conforming to the circumferential contour of the rim arranged in engagement therewith beneath the extension to transmit the supporting stress to the lateral periphery of the wheel.

2. In a wheel attachment of the class described, the combination with a tread plate adapted to be attached to the wheel tread and having projections extending therefrom, of an extension arranged laterally of the tread plate and constituting supporting means for sustaining the wheel upon the surface adjacent thereto, and means for attaching the plate to the wheel including a wheel engaging element conforming to the circumferential contour of the wheel and clamping arms arranged to grip the wheel.

3. In a wheel attachment of the class described, the combination with a tread plate adapted to be attached to the wheel tread and having projections extending therefrom, of an extension arranged laterally of the tread plate and constituting supporting means for sustaining the wheel upon the surface adjacent thereto, a segmental attaching member arranged to engage the wheel felly and rim, and means connecting the member to the extension aforesaid.

4. In a wheel attachment of the class described, the combination of a tread plate adapted to be disposed on the wheel tire and having a laterally extending portion for sustaining the wheel on the surface adjacent thereto, connecting members extending from said last named portion, a clamping member with which said connecting members are connected including a curved wheel engaging plate, and wheel gripping means extending therefrom.

5. In a wheel attachment of the class described, the combination of a tread plate adapted to be disposed on the wheel tire and having an integral laterally extending supporting portion, clamping means for said tread plate including a wheel engaging member and spaced wheel gripping arms so arranged in spaced relation to each other as to engage with the wheel at opposite sides of certain of the wheel spokes, and means for connecting the tread plate and the clamping means together.

In testimony whereof I affix my signature.

JACOB FRIEMAN.